United States Patent Office 3,028,385
Patented Apr. 3, 1962

3,028,385
EPOXY DERIVATIVES OF TRIACRYLYL
PERHYDRO TRIAZINE
Hans Batzer, Arlesheim, Willy Fisch, Binningen, and Daniel Porret, Basel, Switzerland, assignors to Ciba Limited, Basel, Switzerland, a company of Switzerland
No Drawing. Filed Sept. 8, 1960, Ser. No. 54,574
Claims priority, application Switzerland Sept. 17, 1959
3 Claims. (Cl. 260—248)

The present invention provides new water-soluble compounds which contain at least two epoxide groups and correspond to the general formula

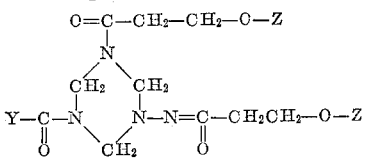

in which Z represents an organic radical containing at least one epoxide group and Y represents a —CH=CH$_2$ or —CH$_2$—CH$_2$—O—Z radical.

According to the present invention the new epoxides are obtained when (A) a derivative of triacrylyl perhydro triazine of the formula

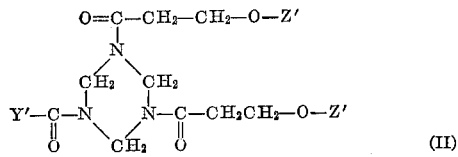 (II)

—in which Z' represents an organic radical containing at least one epoxidizable group and Y' represents a —CH=CH$_2$ or —CH$_2$CH$_2$—O—Z' radical—is treated with an epoxidizing agent; or (B) at least 2 molecular proportions of an alcohol of the formula Z—OH are added on to 1 molecular proportion of triacrylyl perhydro triazine, in which Z has the same meaning as in Formula I.

The term "radical containing an epoxidizable group" further includes radicals containing a halohydrin grouping

(where Hal represents a halogen atom) such as a β-methylglycerol-α-monochlorohydrin radical or a glycerol-α-monochlorohydrin radical. As is known such a halohydrin group can be likewise converted into a 1:2-epoxide group by treatment with a dehydrohalogenating agent.

The unsaturated compounds of the Formula II used as starting material in the variant (A) of the process of the present invention can be prepared, for example, by adding in a first stage at least 2 mols of an alcohol of the formula (Z'—OH on to 1 mol of triacrylyl perhydro triazine.

As a rule the alcohol Z'—OH contains an epoxidizable group. As relevant examples may be mentioned α-methylglycerol-α-monochlorohydrin, β-methylglycerol-α-monochlorohydrin, glycerol-β-monochlorohydrin, glycerol-α-bromohydrin and more especially glycerol-α-monochlorohydrin, as well as mixtures of such monochlorohydrins such, for example, as the commercial mixture of glycerol-β-monochlorohydrin and glycerol-α- monochlorohydrin; furthermore more especially alcohols of the formula

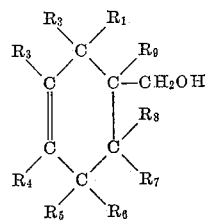 (III)

in which R$_1$ to R$_9$ each represents a monovalent substituent such as a halogen atom, an alkoxy group, or an aliphatic, cycloaliphatic, araliphatic or aromatic hydrocarbon radical, more especially a hydrogen atom, and R$_1$ and R$_5$ together may also represent an alkylene group, such as a methylene group. As examples of such alcohols (III) may be mentioned: Δ$^3$-tetrahydrobenzyl alcohol, 6-methyl-Δ$^3$-tetrahydrobenzyl alcohol, 2:4:6-trimethyl-Δ$^3$-tetrahydrobenzyl alcohol, 1:5-endomethylene-Δ$^3$-tetrahydrobenzyl alcohol and 4-chloro-Δ$^3$-tetrahydrobenzyl alcohol.

As alcohols of the formula Z—OH, which are used in the variant (B) of the present process, there may be mentioned glycidol and alcohols of the formula

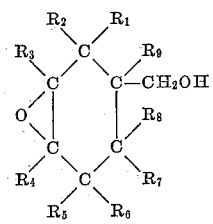 (IV)

such as 3:4-epoxy-hexahydrobenzyl alcohol.

The addition of the alcohol Z'—OH or Z—OH respectively on to the carbon-to-carbon double bond of the α:β-unsaturated compound is advantageously performed in known manner in the presence of a basic catalyst such as sodium hydroxide or more especially of an acid catalyst or a Lewis acid, such as sulfuric acid or boron trifluoride.

According to the variant (A) of the present process compounds of the Formula II that also contain at least one epoxidizable group, such as an epoxidizable carbon-to-carbon double bond or a halohydrin group, are treated with an epoxidizing agent.

The epoxidation of the carbon-to-carbon double bonds to yield the compounds of the present invention is carried out in a conventional manner, preferably with the aid of an organic per-acid such as peracetic, perbenzoic, peradipic, monoperphthalic acid or the like. Another suitable epoxidizing agent is hypochlorous acid; when this compound is used HOCl is added on to the double bond in a first stage and in a second stage the epoxide group is formed by treatment with an agent capable of splitting off hydrogen chloride, for example a strong alkali.

In accordance with what has been said above concerning the meaning of the term "radical containing an epoxidizable group" the treatment according to the invention with an epoxidizing agent includes also the reaction of an agent capable of splitting off hydrogen halide, such as potassium hydroxide or sodium hydroxide, upon a halohydrin group, for example the glycerol-monochlorohydrin group to form the corresponding 1:2-epoxide group or a glycidyl group.

Owing to side reactions the epoxidation may furnish in addition to the diepoxides or polyepoxides also wholly or only partially hydrolysed epoxides, that is to say compounds in which the epoxide group of the polyepoxide of the Formula I has been wholly or partially hydrolysed to form hydroxyl groups.

It has been observed that as a rule the presence of such by-products has a favorable influence upon the technical properties of the cured polyepoxide. It is therefore in general of advantage not to isolate the pure polyepoxides from the reaction mixture.

The compounds of the invention corresponding to the Formula I respond to the conventional curing agents for epoxide compounds and they can therefore be crosslinked or cured by the addition of such curing agents in the same way as other polyfunctional epoxide compounds and epoxy resins respectively. They are particularly suitable for improving, more especially for rendering crease-resistant, fibrous materials, more especially hydroxylated fibrous materials such as cellulose. For this purpose the textile material is impregnated with an aqueous solution which contains a compound of the Formula I as well as a catalyst capable of splitting off acid at an elevated temperature, then dried and finally hardened while being heated.

Curing catalysts capable of splitting off acid at an elevated temperature are, for example:

Ammonium salts of strong acids such as ammonium chloride, ammonium sulfate, ammonium silicofluoride or metal salts such as magnesium chloride or zinc nitrate, and preferably Friedel-Crafts catalysts such as aluminum chloride or boron fluoride or complex compounds thereof, more especially zinc fluoborate.

The impregnation is carried out under the usual conditions and in the usual apparatus such as are known for imparting an anti-crease finish to textile materials. The hardening is preferably carried out between 120 and 160° C. When a so-called spray drier is used, drying and hardening can be performed in a single operation.

When such an improving process is used for fixing mechanically produced effects, the additives generally used in such a process, such as a plasticizer, polyvinyl alcohol or the like, may be added.

Instead of using a compound of the present invention corresponding to the Formula I alone, there may be used a mixture thereof with an aminoplast, for example, a formaldehyde condensation product with melamine, urea or ethyleneurea, and it is of advantage to use an aminoplast that has a low chlorine retention capacity.

As hydroxylated fibrous materials suitable for improvement with a compound (I) of the present invention there may be mentioned those of polyvinyl alcohol and more especially materials containing cellulose. The material to be treated may consist of regenerated cellulose, being a viscose rayon fabric, or of native cellulose being for example a cotton or linen fabric.

In the following examples parts and percentages are by weight, the relationship between part by weight and part by volume being the same as that between the kilogram and the liter.

*Example 1*

A mixture of 50 parts of triacrylyl perhydro triazine, 67 parts of glycerol monochlorohydrin and 100 parts by volume of benzene is mixed with 27 parts of powdered sodium hydroxide of 97% purity while being shaken. An exothermic reaction sets in which lasts for 45 minutes, during which the temperature is maintained at 35–40° C. After one hour the whole is allowed to cool, the sodium chloride formed is filtered off and the filtrate is concentrated under vacuum, to yield 85 parts of a viscid, completely water-soluble resin containing 5.45 epoxide equivalents per kilogram.

The resin consists predominantly of the triepoxide of the formula

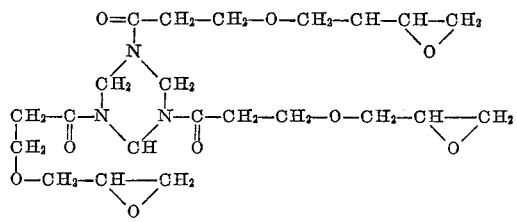

and can be used, for example, for dressing textile materials.

*Example 2*

A mixture of 25 parts of triacrylyl perhydro triazine, 33.6 parts of tetrahydrobenzyl alcohol and 0.8 part of sodium hydroxide solution of 30% strength is stabilized with 0.15 part of hydroquinone and heated for 3 hours at about 90° C. 7 parts of unreacted tetrahydrobenzyl alcohol are then distilled off under a vacuum of 0.15 mm. Hg up to a sump temperature of 100° C., and the adduct obtained is then epoxidized in the following manner:

The highly viscous product is taken up in 100 parts by volume of benzene and treated with 3 parts of sodium acetate. While cooling and stirring vigorously 53 parts of peracetic acid of 40% strength in glacial acetic acid are then added dropwise while maintaining the temperature at 30–35° C. The whole is stirred for 2 hours, diluted with 150 parts by volume of benzene and the acetic acid as well as the unreacted peracetic acid are extracted by washing twice with 100 parts by volume of water on each occasion. The residual acid is then neutralized by washing with 100 parts by volume of sodium hydroxide solution of 5% strength, whereupon the whole is once more washed with 100 parts by volume of water and the reaction product is freed from benzene under reduced pressure, to yield 38 parts of a pale, highly viscous resin which contains 3.0 epoxide equivalents per kg. and consists predominantly of the diepoxide of the formula

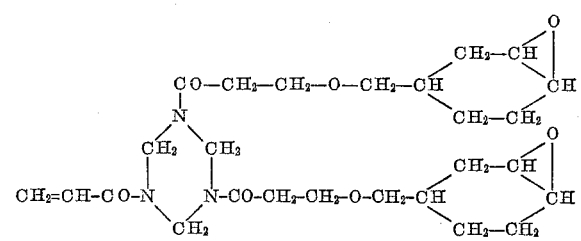

This product can be used for dressing textile materials.

What is claimed is:
1. A compound of the formula

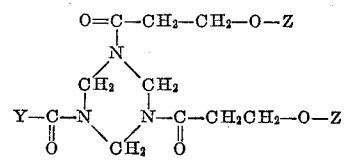

in which Z is a radical selected from the class consisting of

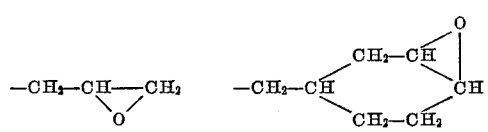

and

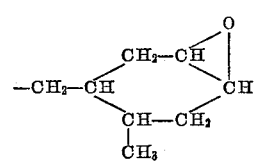

and Y is a radical selected from the class consisting of —CH=CH₂ and —CH₂—CH₂—O—Z, where Z is as above defined.
2. The compound of the formula
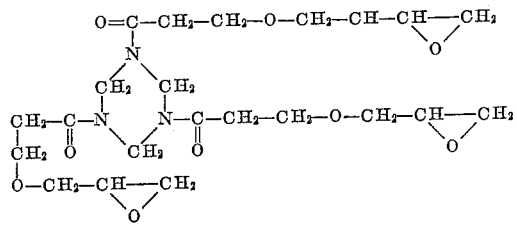
3. The compound of the formula
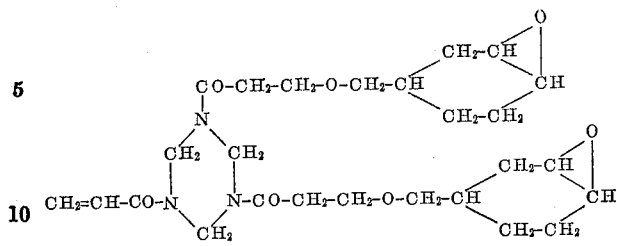
References Cited in the file of this patent
UNITED STATES PATENTS
| | | |
|---|---|---|
| 2,615,888 | Zerner et al. | Oct. 28, 1952 |
| 2,710,873 | Gluesenkamp | June 14, 1955 |
| 2,800,516 | Wilson | July 23, 1957 |
OTHER REFERENCES
Chem. Abstracts., vol. 54, column 14267 (1960).